March 26, 1963 | A. H. BOBECK | 3,083,353

MAGNETIC MEMORY DEVICES

Filed Aug. 1, 1957 | 2 Sheets-Sheet 1

INVENTOR
A. H. BOBECK
BY Kenneth B Hamlin
ATTORNEY

March 26, 1963 A. H. BOBECK 3,083,353

MAGNETIC MEMORY DEVICES

Filed Aug. 1, 1957 2 Sheets-Sheet 2

INVENTOR
A. H. BOBECK
BY Kenneth B. Hamlin
ATTORNEY 3,083,353

MAGNETIC MEMORY DEVICES

Andrew H. Bobeck, Chatham, N.J., assignor to Bell Telephone Laboratories, Incorporated, New York, N.Y., a corporation of New York Filed Aug. 1, 1957, Ser. No. 675,522
45 Claims. (Cl. 340—174)

This invention relates to magnetic memory devices and more particularly to such devices in which information is stored in the form of representative magnetic states and to methods for fabricating such devices.

Magnetic memory devices, particularly those exploiting magnetic materials, such as certain ferrites, displaying a substantially rectangular hysteresis characteristic, are well known and have advantageously found wide application wherever information in a binary form must be temporarily or permanently stored. Thus, for example, magnetic cores of a toroidal form have achieved a particular prominence in computer and data processing applications because of their ability to remain in either of two conditions of remanent magnetization to which driven by an applied magnetomotive force. Toroidal cores, and those which represent specific variations of the closed toroidal core structure, normally have inductively coupled thereto two or more windings which may be used to "set" the core to a particular magnetic condition representative of an information bit to be stored. This may be accomplished by passing a sufficient current either partially through more than one winding or the entire current can be passed through a single winding to produce the required magnetomotive force. Readout is normally accomplished by switching the magnetic condition of the core in a similar manner and observing the signal, if any, produced on a sensing conductor also inductively coupled to the core being read.

The inductive coupling may be accomplished by actually winding a conductor about the core a number of times in the conventional manner or a conductor may merely thread the core to achieve the necessary inductive coupling. Magnetic cores of whichever form having a closed flux path are thus well known as individual memory cells and their many advantages have made possible broad advances in the information handling and switching arts. Conventional magnetic core memory circuits, such as, for example, memory matrices, before being capable of performing their information handling function, however, must be fabricated. The necessary conductors controlling and sensing the magnetic states of the cores must be operatively associated with the cores and the cores themselves must either be mounted or maintained in a manner so as to prevent interaction or interference. A number of expedients, including tedious manual methods, of winding and threading of the individual cores of a core circuit are known. All, however, have left room for improvement in the manner of meeting the core wiring problem and the fabrication of magnetic core circuits, especially in the case of large scale memories, has often heretofore accordingly proved costly and time consuming.

Where considerations of available space dictate, it has also been frequently found necessary to reduce the circuit components including the magnetic memory elements to minimal dimensions. In view of the above demands of winding and threading of the toroidal cores by a number of, and frequently, by many, conductors a limiting dimension is reached below which a toroidal core is not conveniently reducible.

Further, the particular structural configuration of toroidal cores prevents their most economic production from materials exhibiting a maximum degree of temperature stabilization. As a result individual characteristics of toroidal cores change rapidly with temperature and it is generally necessary to provide some means to temperature stabilize magnetic core memory circuits such as those presented by the core arrays of memory matrices. This requirement of temperature stabilization too may prove undesirable in many applications of magnetic memory systems.

The foregoing considerations of magnetic cores and magnetic core memory circuits have been presented to illustrate limiting factors eventually encountered in many extensive core applications. Magnetic toroidal cores although generally representing the optimum in many binary information storage systems, thus may present limitations where the highest degree of utility and performance is required. Accordingly, it is an object of this invention to provide a new and improved magnetic storage element.

It is another object of this invention to accomplish the storage of information as represented by a particular magnetic state in a new and simpler manner, involving fewer structural elements, and affording advantages not heretofore known.

A further object of this invention is the realization of a new and improved magnetic memory matrix.

A still further object of this invention is the provision of a new and improved magnetic memory matrix capable of being fabricated in a manner involving fewer steps and none of the problems of winding and threading encountered in previous known magnetic memory matrices.

Yet another object of this invention is the reduction in the size of individual magnetic memory elements and also in the size of magnetic memory matrices comprising such elements.

It is also an object of this invention to provide a magnetic memory element of a character such as to effect a substantial reduction in the cost and the time required in the fabrication of larger memory circuits of which the memory element is part.

Still another object of this invention is to permit the manufacture of a magnetic memory element from materials exhibiting a greater degree of temperature stability.

The foregoing objects are realized in accordance with the principles of this invention by establishing a preferred or "easy" magnetic flux path in association with an electrical conductor. The electrical conductor with its associated preferred magnetic flux path then constitutes one of the elements of a new conductor-memory element or cell. An information bit may be stored in such a conductor-memory element by passing a current through the conductor itself and through a conventional electrical conductor inductively coupled to the conductor having the preferred path established therein. As a result, a magnetic flux of a particular direction is induced with the flux assuming the "easy" or preferred path originally established.

In one illustrative embodiment according to the principles of this invention a preferred helical path is established in a conductor of a magnetic material. Such a helical path may conveniently be established in a magnetic conductor in a number of ways. For example, a torsional stress may be exerted on the conductor, and when this means is employed a ready comprehension of this invention may be obtained in accordance with known principles of magnetism generally. These known principles of magnetism are manifested in one case by the torsional strain exerted on a suitable magnetic rod carrying a current when the rod is magnetized by an external field. This effect is a consequence of the resultant helical flux field causing a change in length of the rod in a helical sense. Conversely, in another case, it is also known that a similar rod to which a torsional strain is applied will generate a difference of potential between its ends when the rod is magnetized. In accordance with these principles all magnetic materials are strain sensitive to some degree, the sensitivity depending upon both the chemical composition and the mechanical working of the material. If unannealed nickel wire, for example, is subjected to a torsion, the preferred direction of magnetization will follow the direction of greatest compression, as would be predictable from the negative magnetostrictive coefficient of nickel.

In the application of these magnetic principles, it was found that both the amplitude and polarity of the observed signal can be varied by changes in a helically established flux path of a conductor or rod, which in one specific embodiment comprised the nickel mentioned above. By the same changes in the helical flux path it was further found that the observed potential difference between the ends of the conductor memory element was substantially greater than the voltage induced in a sensing means inductively coupled to the conductor memory element. The direction of the established flux helix determines the polarity of the difference potential generated while the pitch of the flux helix determines the magnitude of the potential.

Thus, according to one aspect of this invention, it is a feature thereof that the basic magnetic memory element itself may constitute the conductor or one of the conductors through which a current is passed to set the element to a particular magnetic condition representative of an information bit to be stored.

According to another aspect of this invention it is a feature thereof that a conductor-memory element in accordance with the foregoing feature has a preferred or "easy" flux path established therein such that an induced magnetization of either direction will follow the preferred flux path established.

It is still another feature of this invention that a helical preferred or "easy" flux path is established in a magnetic conductor by subjecting the conductor to a torsional stress.

A further feature of this invention comprises a magnetic conductor having a helical preferred flux path established therein by annealing the conductor in a helical magnetic field.

A still further feature of this invention is a magnetic conductor having a helical preferred flux path established therein by helically grooving the periphery of the conductor.

According to a further aspect of this invention it is a feature thereof that an effective transformer action is realized by the read-out from a magnetic conductor element having a helical preferred or "easy" flux path established therein. Thus, considering a conventional electrical conductor inductively coupled to a magnetic conductor element as the primary winding and the magnetic conductor element itself as the effective secondary winding, a substantial voltage step-up is achieved across the ends of the magnetic conductor element when a signal is applied across the primary conductor.

According to another feature of this invention, a plurality of basic magnetic conductor elements, each having a preferred helical flux path established therein, may be arranged in parallel and a plurality of conventional conductors may also be arranged in parallel and substantially at right angles to the magnetic conductor elements to form a lattice. Such a lattice, in which the conductors at right angles are inductively coupled, advantageously comprises a coordinate magnetic memory array or matrix when associated with suitable, known access circuits. A particular information bit is readily stored in any address of such an array by applying coincident currents to the coordinate conductors defining the address, of the total magnitude necessary to establish a magnetization of a particular polarity in the portion of the helical path of the magnetic conductor element constituting the address The coordinate conductors in this case would comprise the conductor memory elements and the inductively coupled conventional conductors crossing at the information addresses. Read-out is accomplished by reversing the above currents in the case of a bit organized array or by overdriving in the reverse direction only a conductor memory element in the case of a word organized array. In both cases the induced voltages are observed which are generated between the ends of the conductor memory elements by the switching of the magnetic polarity in the helical path.

Still another feature of this invention is the new and improved method of fabricating a magnetic memory matrix made possible by the employment of the memory elements of this invention. According to this feature the transverse and parallel sets of conductors, one set of which comprises the memory elements, may advantageously be woven together. By this method variations in the degree of inductive coupling may readily be achieved by, in effect, increasing or decreasing the number of "turns" associated with the conductor memory element. Obviously the size of a magnetic memory matrix fabricated in accordance with this invention may be reduced to a point limited only by the physical dimensions of the transverse conductors and conductor memory elements and their magnetic characteristics.

The foregoing and other objects and features of this invention will be clearly understood from a consideration of the detailed description thereof which follows when taken in conjunction with the accompanying drawing in which.

Figures 1, 2:
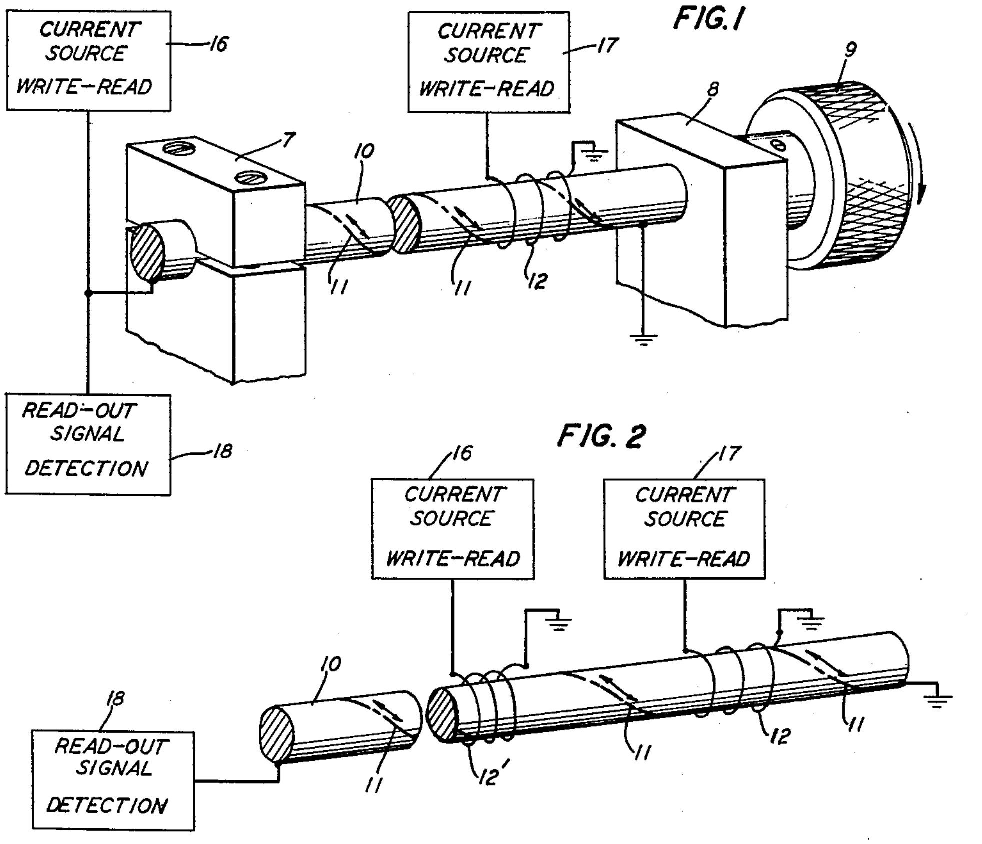
FIG. 1 depicts one illustrative magnetic memory element according to the principles of this invention, together with a representative means for establishing the preferred flux path in the memory element, the preferred helical flux path being assumed and represented only symbolically on the surface of the element.
FIG. 2 depicts another magnetic memory element according to the principles of this invention similar to that shown in FIG. 1.
Figure 6:
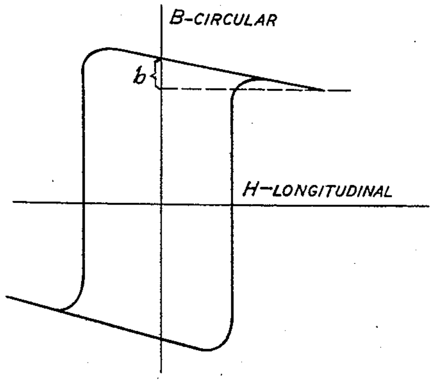
FIG. 6 represents an idealized hysteresis loop of the materials employed in achieving one illustrative embodiment of this invention.

As shown in FIG. 1, a magnetic memory element according to this invention comprises a conductor 10 in which a helical flux path, represented symbolically by the broken helical line 11, has been established. In one embodiment of this invention an unannealed nickel wire having a diameter of the order of .003 inch was found satisfactory for this purpose. The hysteresis loop characteristic in the axial direction as indicated in FIG. 6 was also found to be sufficiently rectilinear to meet the requirement of magnetic remanence. In this connection it should be noted that the non-rectangular portions of the loop for the nickel material usable for the memory element of this invention as shown in idealized form in FIG. 6, presents a negative slope rather than the positive slope presented by conventional ferrite memory cores. As a result, the excursion of the flux, represented as $b$ in FIG. 6, during the application of shuttling currents rather than switching currents, advantageously generates negative rather than positive noise signals as will presently appear. Although one material selected for the conductor memory element exhibited such a negative slope loop, it is to be understood that materials having more conventional hysteresis loops are also acceptable to practice this invention.

Assuming, initially, the absence of a preferred flux path in the conductor 10, a preferred helical path may be established therein by conveniently applying a torsional stress to the conductor 10 in the manner shown in FIG. 1. Thus one end of the conductor 10 may be rigidly maintained by clamping means 7, while the other end is frictionally held by the means 8. By means of the knurled knob 9 which is rigidly affixed to the conductor 10, the latter is readily twisted in any desired amount. The easy direction of magnetization is thus readily established in a substantially helical direction. Although nickel proved to respond magnetically to an applied torque in the above manner, other methods of establishing a helical flux path may advantageously be employed. Thus, for example, by annealing a conductor of, say, perminvar, in a helical magnetic field the helically predisposed direction of magnetization may literally be frozen into the conductor. Other methods of achieving a substantially helical flux path will be considered in connection with the description of specific illustrative embodiments of this invention hereinafter.

In the memory element shown in FIG. 1, one end of the conductor 10 is connected to ground and the other end is connected to a suitable source of current 16. An insulated solenoid 12, also connected at one end to ground and at the other end to a suitable source of current 17, is inductively coupled to the conductor 10 by its winding. The current sources 16 and 17 may be of any type well-known in the art and are shown only in block symbol form. In practice the solenoid function may be accomplished by a single insulated copper conductor passing at an angle with the conductor 10 and inductively coupled thereto.

Assuming the presence in the conductor 10 of a flux in the helical path of one direction as represented by the line 11, a current must be applied of a magnitude sufficient to generate a magnetomotive force which will switch the direction of flux in an opposite direction in the helical path. The magnitude of this force may be determined as $h$. When a current pulse producing a magnetomotive force of the magnitude $$\frac{h}{2}$$

is now applied from the source 16 of a polarity to oppose the helical flux simultaneously with a current pulse producing a magnetomotive force of the magnitude $$\frac{h}{2}$$

from the source 17, the total magnetomotive force will be sufficient to switch the flux state of the conductor 10. The polarity of the current pulse required from the source 17 will depend upon the sense of the winding of the solenoid 12. The flux state to which the conductor 10 has been thus switched may be regarded as a particular information bit, say a binary "1," which it is desired to store and this operation would constitute the write phase of the memory function. It should be noted that, in accordance with the principles of coincident current memory elements generally, either of the current pulses applied from the sources 16 and 17 alone will be insufficient to accomplish the magnetic switching. The two directions of flux in the helical path are indicated in FIG. 1 by double-ended arrows.

Information stored in the magnetic conductor 10 is read out by reversing the polarity of the currents applied from the current sources 16 and 17. The simultaneous reverse current pulses will again cause a switch in the direction of magnetization in the helical path if an information bit has been previously stored in the manner described above. Obviously, if in the write phase of operation the conductor 10 had not been magnetically switched for whatever reason, no switching will occur during the read-out phase, although, as previously noted, a shuttling action represented by the excursion of the hysteresis loop may take place. When the magnetic state of the conductor 10 is switched, a change in the potential between its ends will result. This change may be detected by suitable detection means 18 as an output pulse superimposed upon the switching current pulse applied to the conductor 10. When the magnetic state of the conductor 10 is not reversed with respect to polarity, as would be the case, say if a binary "0" had been stored, an irrelevant noise signal may be generated due to the above-mentioned excursion, the magnitude of which would be determined by the degree that the hysteresis characteristic of the conductor 10 material fails to achieve complete rectangularity. This is obviously completely analogous to the performance of conventional ferrite memory cores. However, due to the negative slope of this portion of the hysteresis curve of the material used for this embodiment, the noise signal will be a negative one as contrasted with the positive noise signal well known in the employment of conventional toroidal cores. Such a negative noise signal is obviously more conveniently dealt with in this case than a positive noise signal would be.

Read-out may also be accomplished by simply overdriving the solenoid 12 by a current producing a sufficient reverse magnetomotive force applied from the current source 17 alone. In this case the memory conductor 10 itself would act only as a read-out lead, the output signal also being detected by the means 18. This means of read-out is particularly adaptable in the employment of the memory element of this invention in the formation of memory arrays as will be described in detail hereinafter.

Although the memory element above considered has been described and is shown in FIG. 1 as being a solid wire, the present invention is not so limited. Thus, for example, a composite element comprising an electrically conductive, non-magnetic inner wire clad with a magnetic skin will also serve as a memory element. Such a composite wire could prove advantageous, for example, in the reduction of eddy current losses within reasonable limits of wire dimensions. A memory element of the composite type is readily fabricated by the plating, evaporating, or extrusion of a nickel outer layer on a nichrome inner conductor; or nickel on copper has been found suitable for this purpose. A coaxial arrangement has also been found practicable as a variation in the manner of constructing a memory element and is advantageous in minimizing noise pick-up. In this case either both inner and outer conductors may be magnetic or a combination of magnetic and non-magnetic conductors may be used.

It is, of course, possible to store many bits of information along a single conductor memory element. The allowable number of such bits would be determined by the coercive force applied, the saturation flux density, and the physical dimensions of the conductor, to name a few of the considerations involved.

The memory element shown in FIG. 2 is another illustrative application of the principles of this invention in which the conductor 10 is adaptable for direct replacement for a conventional coincident current toroidal core. To make such a replacement complete in detail, an additional sensing lead would be inductively coupled to the conductor 10 in addition to the write conductors 12 and 12′ shown. However, more advantageously, the conductor 10 itself may be used as the sensing wire. In FIG. 2, the conductor 10 is shown as also having a substantially helical flux path established therein which may be accomplished by the available methods as considered above and as shown in FIG. 1. A pair of insulated solenoids 12 and 12' are here inductively coupled to the conductor 10 in the same sense, each of which is connected at one end to ground and each of which is connected at the other end to a current source, such as the sources 16 and 17, respectively, also employed in connection with the embodiment of FIG. 1. When current pulses of the same polarity each producing a magnetomotive force of the magnitude $$\frac{h}{2}$$

are coincidentally applied from the sources 16 and 17, a magnetic flux will be induced in the helical path 11, the direction of which will be determined by the sense of the solenoid windings 12 and 12' and the polarities of the applied coincident current pulses. The flux direction or polarity, of course, will determine the character of the particular information bit stored in the memory element. It should here also be noted that a current pulse as above applied from either source 16 or 17 alone will not alone be sufficient to switch or establish a magnetization in the flux path. Read-out in this case is accomplished by reversing the polarity of the current pulses applied from sources 16 and 17 in order to switch the magnetization in the helical path written in by the current pulses previously described. The voltage induced across the ends of the conductor 10 is then read by the detection means 18 shown as connected to one end of the conductor 10 in FIG. 2. The voltage induced by the magnetization switch may also be read from an external sensing lead, not shown, as suggested above.

Figure 3:
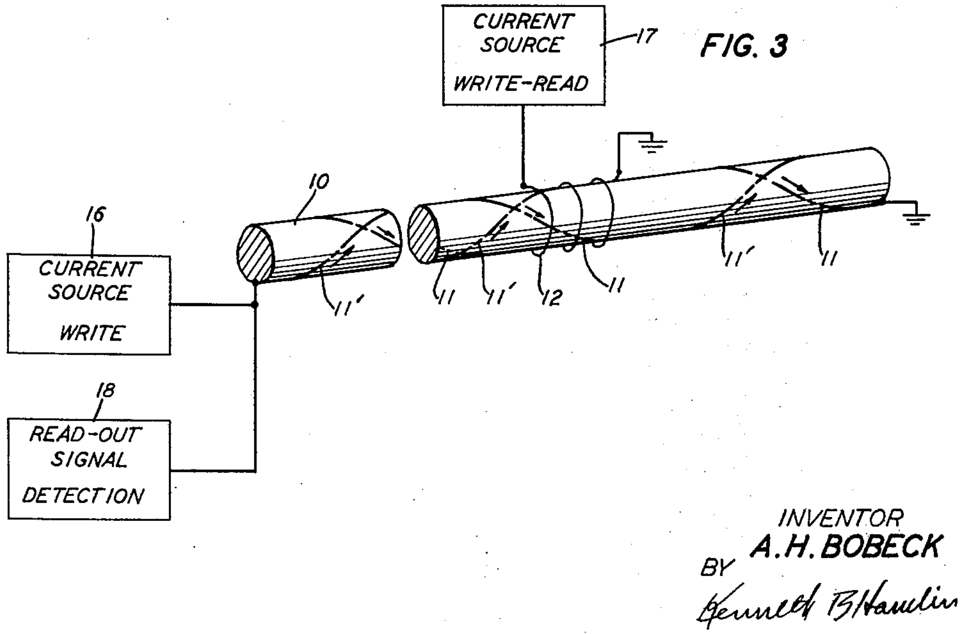
FIG. 3 depicts a magnetic memory element in which the principles of this invention are applied to realize a pair of substantially helical paths in the memory element.

Still another application of the principles of this invention is shown in FIG. 3. In the conductor memory element there shown, no initially preferred flux path is established. An insulated solenoid winding 12 connected to a current source 17 is inductively coupled to the magnetic conductor 10 as was the case with respect to the element of FIG. 1. The conductor 10 of FIG. 3 is also connected at one end to a source of current 16, the other end, as also the other end of the solenoid 12, being connected to ground. By the proper coincident application of external current pulses, each producing a magnetomotive force $$\frac{h}{2}$$

from the sources 16 and 17, information may be stored in the conductor 10 in the form of a flux following a helix of one sense for one binary value and following a helix of the other sense for the other binary value. During the write operation the polarity of the current pulse applied from the source 17, and therefore the solenoid 12, may remain the same for either binary value and the polarity of the current pulse applied to the conductor 10 may then be selected to achieve the proper sense of the flux helix in accordance with the information bit to be stored. Read-out in the case of the embodiment of FIG. 3 is accomplished by applying a current pulse of opposite polarity from the source 17 alone. This latter read-out current pulse may be of a magnitude sufficient only to produce a magnetomotive force which will shift a helical flux to one following an axial path with respect to the conductor 10. This shift then induces the read-out voltage, which voltage will be either a positive or a negative signal depending upon the particular binary value stored. This read-out voltage may be read out directly across the memory element itself as indicated by the signal detection means 18.

In both of the embodiments shown in FIGS. 2 and 3, the memory element may also comprise a composite conductor having an outer magnetic layer over an inner non-magnetic conducting center, as was the case for the embodiment of FIG. 1.

Figures 4, 5, 7:
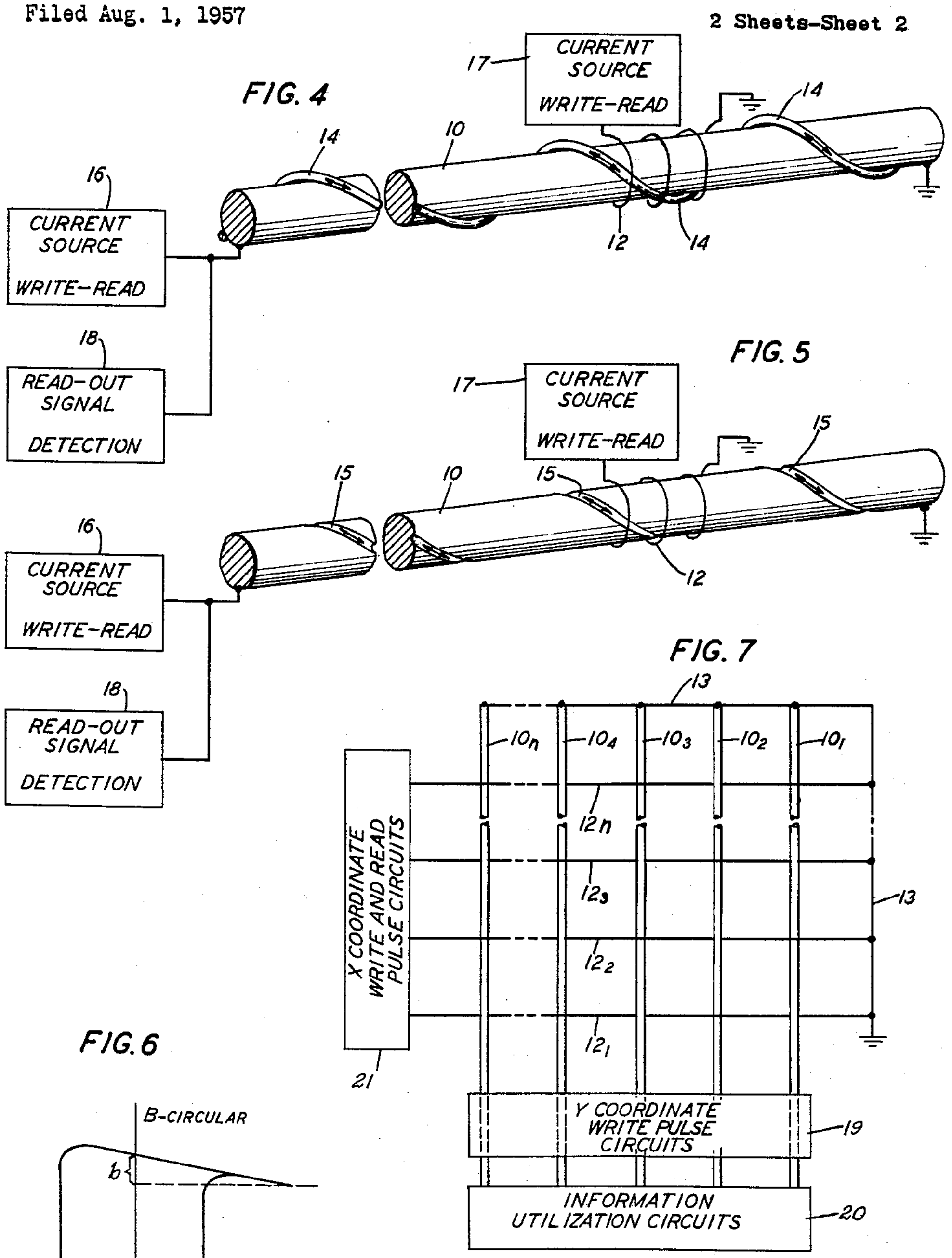
FIG. 4 shows another manner of applying the principles of this invention to realize a further illustrative magnetic memory element in which the helical flux path is externally applied.
FIG. 5 depicts another illustrative embodiment of this invention in which the helical flux path is also externally applied.
FIG. 7 depicts an illustrative word-organized memory matrix utilizing the memory elements of this invention, which elements are shown slightly exaggerated in dimension for purposes of contrast.

In FIG. 4 the embodiment of this invention shown presents a clearly defined helical magnetic flux path without the necessity of applying an external stress or of physically treating the conductor 10. In this case the conductor 10 may itself be non-magnetic but has wound about it at a given pitch a magnetic winding 14. The possible directions of the flux in the helical flux-containing winding 14 is again shown by means of double-ended arrows. Although the magnetic winding 14 is in fact external to the conductor 10, the two elements may be assumed as forming an integral conductor element as was the case for the embodiments of FIGS. 1, 2, and 3 in which the helical flux path was also an integral component of the conductor 10. One end of the conductor 10 is again connected to a current source 16 and the other end is connected to ground. An external insulated solenoid 12, one end of which is connected to ground, is also connected to a current source 17 and is inductively coupled to the conductor 10. In operation and application the embodiment of this invention according to FIG. 4 is identical to that described for the embodiment of FIG. 1.

One further means of establishing a preferred helical flux path in a magnetic conductor is shown in FIG. 5. This arrangement is also similar in operation and application to that of FIG. 1. The preferred helical flux path is established in the conductor 10, however, by threading or grooving its surface to form a thread 15 thereon. The thread or groove cut in the surface of conductor 10 by any suitable means establishes a boundary constraint upon the flux, forcing it to follow the direction of the helical groove.

Although the embodiments of this invention which have been described have assumed a circular cross section for the conductor memory element, it is to be understood that other cross sections may also be advantageously employed. Thus any cross section which permits the establishment of a preferred flux path therein may be used to perform this invention.

A magnetic memory element according to this invention is highly advantageous as a basic element in the fabrication of a coordinate memory array such as the illustrative array shown in FIG. 7. Such an array comprises simply a lattice of transverse parallel conductors 10 and parallel conventional insulated copper conductors constituting the solenoids 12. One end of each of the conductors 10 and 12 is connected to a ground bus 13. The other end of each of the conductor memory elements 10 is connected to suitable $y$ coordinate write current pulse circuits 19. Such circuits are well known in the magnetic memory and information handling art and in this case would produce appropriately timed current pulses of a magnitude to generate an $$\frac{h}{2}$$

magnetomotive force with respect to the conductors 10. In addition, each of the conductors 10 is also connected to information utilization circuits 20 capable of accepting binary coded output pulses. Such circuits will also present themselves to one skilled in the art and do not require detailed description.

The other end of each of the conventional conductors 12 is connected to suitable $x$ coordinate write and read current pulse circuits 21 also well known in the art and similar in operation to the write pulse circuits included in the block 19. The illustrative memory array of FIG. 7 is word-organized, that is, the information bits of each word stored appear at the portions of the conductors 10 inductively coupled to the transverse conductors 12. In the writing operation in the array the word level is selected by applying a current pulse of the proper magnitude to a selected $x$ coordinate conductor 12. Simultaneously the particular bit information is introduced by pulsing the $y$ coordinate conductors 10 in accordance with the bits of the word to be stored. The read operation is simply performed by applying a read current pulse of opposite polarity to that of the write current pulse and of proper magnitude to only the particular $x$ coordinate conductor 12 defining the row in which the word appears. Output signals will then appear in parallel form at the terminals of the conductors 10 which contained the information bits of the word read out. The particular conductor 10 contemplated in the foregoing description of an illustrative matrix may be, for example, any one of the magnetic conductors of FIGS. 1, 3, 4, or 5 since the reading operation was not described as a coincident current operation for these memory elements.

A magnetic memory matrix such as that described may conveniently be fabricated by weaving the transverse conductors together in a manner similar to that also employed in the fabrication of a wire mesh or screen. The facility of well known methods of weaving may then be made available to obviate tedious and time consuming threading methods generally only available in the fabrication of conventional toroidal core memories.

What have been described are considered to be only illustrative embodiments of the present invention and it is to be understood that numerous other arrangements and modifications as well as other applications may be devised by one skilled in the art without departing from the spirit and scope of this invention.

What is claimed is:

1. A memory element comprising a first conducting means including a helical magnetizable component, said component having a substantially rectangular hysteresis characteristic, and inductive means associated only with a discrete segment of said helical magnetizable component for determining a particular condition of remanent magnetization in said segment of said component.

2. A memory element according to claim 1 in which said inductive means comprises a second conducting means inductively coupled to said segment of said component, and means for applying currents to said second conducting means.

3. A memory element according to claim 2 also comprising means for applying other currents to said second conducting means for switching said particular condition of remanent magnetization, and means for detecting voltage changes between the ends of said first conducting means.

4. A memory element comprising a first conducting means including a helical magnetizable component, said component having a substantially rectangular hysteresis characteristic, a second conducting means inductively coupled to only a discrete segment of said component, and means for applying coincident currents to said first and said second conducting means to determine a particular condition of remanent magnetization in said discrete segment of said helical component.

5. A memory element according to claim 4 also comprising inductive means for reversing said condition of remanent magnetization in said helical component, and means for detecting voltage changes between the ends of said first conducting means.

6. A memory element comprising a magnetic conductor having a substantially rectangular hysteresis characteristic and having a substantially helical flux path established therein, and inductive means including means associated only with a discrete segment of said flux path for determining a condition of remanent magnetization in said flux path.

7. A memory element according to claim 6 in which said inductive means includes said magnetic conductor.

8. A memory element comprising a magnetic first conductor having a substantially rectangular hysteresis characteristic and having a substantially helical flux path established therein, a second conductor inductively coupled to said first conductor at only a discrete segment of said flux path, and means for applying currents to said first and said second conductor for determining a remanent magnetic flux in said segment of said helical path in one direction.

9. A memory element according to claim 8 also comprising means for applying other currents to said first and said second conductor for switching the remanent magnetic flux in said segment of said helical path to a second direction.

10. A memory element according to claim 9 also comprising means for detecting voltage changes between the ends of said first conductor.

11. A memory element comprising a magnetic first conductor having a substantially rectangular hysteresis characteristic and having a torsional stress applied thereto, a non-magnetic second conductor inductively coupled to said first conductor, and means for applying currents to said first and said second conductor for determining a remanent magnetic flux in said first conductor in one direction.

12. A memory element according to claim 11, also comprising means for applying other currents to said first and said second conductor for switching the said remanent magnetic flux in said first conductor in another direction, and means for detecting voltage changes between the ends of said first conductor.

13. A memory element according to claim 11, also comprising means for applying a current of the opposite direction to said second conductor for switching the said remanent magnetic flux in said first conductor in another direction, and means for detecting voltage changes in said first conductor.

14. A memory element comprising a magnetic first conductor having a substantially rectangular hysteresis characteristic, means for twisting said first conductor to establish a substantially helical flux path therein, a non-magnetic second conductor inductively coupled to said first conductor, means for coincidentally applying currents to said first and said second conductors for determining a remanent magnetic flux in said helical flux path in one direction, means for applying switching currents to said first and said second conductors for switching said remanent magnetic flux to the opposite direction, and means for detecting voltage changes between the ends of said first conductor.

15. A memory element comprising a magnetic first conductor having a substantially rectangular hysteresis characteristic, means for twisting said first conductor to establish a preferred helical flux path therein, non-magnetic second and third conductors inductively coupled to said first conductor, means for coincidentally applying currents to said second and third conductors to determine a remanent magnetic flux in said helical flux path in one direction, means for applying switching currents to said second and third conductors to switch said remanent magnetic flux to the opposite direction, and means for detecting voltage changes between the ends of said first conductor.

16. A memory element comprising a magnetic conductor having a substantially rectangular hysteresis characteristic and having a substantially helical flux path established therein, means including said magnetic conductor for applying a circular magnetic field to said conductor, and means associated only with a discrete segment of said flux path for applying a longitudinal magnetic field to said conductor, said fields combining to determine a remanent magnetic flux in one direction in said segment of said helical path.

17. A memory element comprising a magnetic conductor having a substantially rectangular hysteresis characteristic, means including said magnetic conductor for applying a circular magnetic field to said conductor, and means associated only with a discrete segment of said conductor for applying a longitudinal magnetic field to said conductor, said fields combining to determine a substantially helical flux in said magnetic conductor at said segment.

18. A memory element comprising a magnetic conductor having a substantially rectangular hysteresis characteristic, a non-magnetic conductor inductively coupled to said magnetic conductor at only a discrete segment thereof, means for applying a first current to said magnetic conductor to establish a magnetic field circular with said magnetic conductor, and means for applying a second current to said non-magnetic conductor coincidentally with said first current to establish a magnetic field longitudinal to said magnetic conductor, said fields combining to determine a substantially helical flux in one sense in said magnetic conductor at said segment.

19. A memory element according to claim 18, also comprising means for applying a switching current to said magnetic conductor for shifting said helical flux in said segment of said magnetic conductor, and means for detecting voltage changes between the ends of said magnetic conductor.

20. An information bit storage element comprising a magnetic conductor having a substantially rectangular hysteresis characteristic, a non-magnetic conductor inductively coupled to said magnetic conductor, means for applying a first current to said magnetic conductor to establish a magnetic field circular with said magnetic conductor, means for applying a second current to said non-magnetic conductor coincidentally with said first current to establish a magnetic field longitudinal to said magnetic conductor of a particular polarity, said fields combining to determine a substantially helical flux of a particular sense in said magnetic conductor, said sense of said helical flux representing the particular information bit stored, means for applying a switching current to said magnetic conductor for shifting said helical flux in said magnetic conductor, and read-out means connected electrically to said magnetic conductor for detecting voltage changes between the ends of said magnetic conductor responsive to the shift of said helical flux.

21. A memory element comprising a magnetic wire having a substantially rectangular hysteresis characteristic, means for establishing a preferred helical flux path in said wire, an electrical conductor inductively coupled to said wire, means for simultaneously applying a current pulse to said wire and to said conductor to determine a remanent magnetization in said helical flux path in one direction, means for switching the remanent magnetization in said helical flux path in the opposite direction, and means for detecting voltage changes between the ends of said wire responsive to said switch of said magnetization.

22. A memory element according to claim 21 in which said means for establishing a preferred helical flux path in said wire comprises means for applying a predetermined torsion to said wire.

23. A memory element according to claim 22 in which said means for switching the remanent magnetization in said helical flux path comprises means for applying a current pulse of an opposite polarity to said wire.

24. A memory element according to claim 21 in which said means for establishing a preferred helical flux path in said wire comprises a helically applied groove on the surface of said wire.

25. A memory element comprising a magnetic first conductor having a substantially rectangular hysteresis characteristic, said first conductor having a helical groove applied on the surface thereof, a non-magnetic second conductor indutively coupled to said first conductor, means for coincidentally applying currents to said first and said second conductors to establish a substantially helical flux in said first conductor, means for coincidentally applying switching currents to said first and said second conductors to switch the direction of said flux, and means for detecting voltage changes between the ends of said first conductor responsive to said switch of the direction of said flux.

26. A memory element comprising a first conductor having a magnetic wire helically wound therearound, said wire having a substantially rectangular hysteresis characteristic, a non-magnetic second conductor inductively coupled to said first conductor, means for coinidentally applying currents to said first and said second conductors to establish a remanent magnetization in said helical wire in one direction, means for coincidentally applying switching currents to said first and said second conductors to switch said remanent magnetization in another direction, and means for detecting voltage changes between the ends of said first conductor responsive to said switch of the direction of said flux.

27. A memory element comprising a magnetic conductor having a substantially rectangular hysteresis characteristic and having a substantially helical flux path established therein, a plurality of address conductors inductively coupled to said magnetic conductor, means for applying a first current to said magnetic conductor, means for selectively applying second currents to said plurality of address conductors, said first current and said second currents combining to determine particular conditions of remanent magnetization in said helical flux path, means for selectively applying third currents of opposite polarity to said plurality of address conductors to switch said particular conditions of remanent magnetization, and means for detecting voltage changes in said magnetic conductor.

28. An information storage element comprising a magnetic conductor having a substantially rectangular hysteresis characteristic and having a substantially helical flux path established therein, a plurality of address conductors inductively coupled to said magnetic conductor and defining a plurality of information addresses in said magnetic conductor, means for applying a current pulse to said magnetic conductor, means for selectively applying a current pulse to particular ones of said plurality of address conductors, said current pulses combining to determine a particular condition of remanent magnetization in said helical flux path at particular ones of said information addresses, means for selectively applying a current pulse of opposite polarity to said plurality of address conductors to switch said particular conditions of remanent magnetization, and means for detecting voltage changes in said magnetic conductor.

29. An information storage matrix comprising a plurality of magnetic conductors each having a substantially rectangular hysteresis characteristic and each having a substantially helical flux path established therein, a plurality of transverse electrical conductors inductively coupled to each of said magnetic conductors, each of said electrical conductors defining an information address on each of said magnetic conductors, means for selectively applying a current pulse to particular ones of said plurality of magnetic conductors, means for selectively applying a current pulse to particular ones of said plurality of electrical conductors, said current pulses on said ones of said magnetic and said ones of said electrical conductors combining to determine a particular condition of remanent magnetization in said helical flux path at particular ones of said information addresses.

30. An information storage matrix according to claim 29 also comprising means for applying a current pulse of an opposite direction to the conductors defining a particular address to switch the condition of said remanent magnetization at said particular address.

31. An information storage matrix according to claim 30 also comprising means for detecting voltage changes in said magnetic conductors.

32. An information storage matrix comprising a plurality of magnetic conductors each having a substantially rectangular hysteresis characteristic and each having a substantially helical flux path established therein, a plurality of transverse electrical conductors inductively coupled to each of said magnetic conductors, each of said eletrical conductors defining an information address on each of said magnetic conductors, means for selectively applying a current pulse to particular ones of said plurality of magnetic conductors, means for applying a current pulse to a particular one of said electrical conductors, said current pulses on said ones of said magnetic conductors and said current pulse on said one of said electrical conductors combining to determine a particular condition of remanent magnetization in said helical flux path at particular ones of said information addresses defined by said particular one of said electrical conductors and said particular ones of said magnetic conductors, means for applying a current pulse of an opposite direction to said particular one of said electrical conductors to switch the condition of said remanent magnetization at said particular ones of said information addresses, and means for detecting voltage changes in each of said magnetic conductors.

33. A magnetic memory array comprising columns of magnetic conductors, each of said magnetic conductors having a substantially rectangular hysteresis characteristic and having a substantially helical flux path established therein, rows of electrical conductors inductively coupled to said columns of magnetic conductors, said columns and rows defining a plurality of memory addresses at the intersections thereof, and means for selectively applying coincident currents to said columns and one of said rows of conductors to determine a particular condition of remanent magnetization in the helical flux path in particular ones of said plurality of addresses.

34. A magnetic memory array according to claim 33 also comprising means for applying a current of opposite polarity to said one of said rows of conductors to switch said particular condition of remanent magnetization in said particular ones of said plurality of addresses, and means for detecting induced voltages in each of said columns of magnetic conductors.

35. A memory element comprising a first conductor comprising a solid magnetic wire having a substantially rectangular hysteresis characteristic and having a preferred flux path established therein, a second conductor inductively coupled to said first conductor only at a single segment thereof, and means for applying currents to said first and said second conductor for determining a remanent magnetic flux in said preferred flux path in one direction at said single segment.

36. A memory element according to claim 35 also comprising means for applying other currents to said first and said second conductor for switching the remanent magnetic flux in said preferred path at said single segment to a second direction, and means for detecting voltage changes between the ends of said first conductor.

37. A memory element comprising a first conductor comprising a solid magnetic wire having a substantially rectangular hysteresis characteristic, means for establishing a preferred flux path in said magnetic wire, a second conductor inductively coupled to said first conductor only at a single segment thereof, means for coincidentally applying currents to said first and said second conductors for determining a remanent magnetic flux in said preferred flux path in one direction at said single segment, means for applying switching currents to said first and said second conductors for switching said remanent magnetic flux to the opposite direction, and means for detecting voltage changes between the ends of said first conductor.

38. An information storage matrix comprising a plurality of memory conductors each comprising a solid magnetic wire having a substantially rectangular hysteresis characteristic and having a preferred flux path established therein, a plurality of transverse electrical conductors inductively coupled to each of said memory conductors, each of said electrical conductors defining an information address on each of said memory conductors, means for selectively applying a current pulse to particular ones of said plurality of memory conductors, means for applying a current pulse to a particular one of said electrical conductors, said current pulses on said ones of said memory conductors and said current pulse on said one of said electrical conductors combining to determine a particular condition of remanent magnetization in said preferred flux path at particular ones of said information addresses defined by said particular one of said electrical conductors and said particular ones of said memory conductors, means for applying a current pulse of an opposite direction to said particular one of said electrical conductors to switch the condition of said remanent magnetization at said particular ones of said information addresses, and means for detecting voltage changes in each of said memory conductors.

39. An information storage matrix comprising a plurality of memory conductors each comprising a solid magnetic wire having a substantially rectangular hysteresis characteristic, means for establishing a preferred flux path in each of said magnetic wires, a plurality of transverse electrical conductors inductively coupled to each of said memory conductors, each of said electrical conductors defining an information address on each of said memory conductors, means for selectively applying a current pulse to particular ones of said plurality of memory conductors, means for applying a current pulse to a particular one of said electrical conductors, said current pulses on said ones of said memory conductors and said current pulse on said one of said electrical conductors combining to determine a particular condition of remanent magnetization in said preferred flux path at particular ones of said information addresses defined by said particular ones of said electrical conductors and said particular ones of said memory conductors, means for applying a current pulse of an opposite direction to said particular one of said electrical conductors to switch the condition of said remanent magnetization at said particular ones of said information addresses, and means for detecting voltage changes in each of said memory conductors.

40. An information storage matrix comprising a plurality of magnetic conductors each having a substantially rectangular hysteresis characteristic, means for establishing a substantially helical flux path in each of said magnetic conductors, a plurality of transverse electrical conductors inductively coupled to each of said magnetic conductors, each of said electrical conductors defining an information address on each of said magnetic conductors, means for selectively applying a current pulse to particular ones of said plurality of magnetic conductors, means for applying a current pulse to a particular one of said electrical conductors, said current pulses on said ones of said magnetic conductors and said current pulse on said one of said electrical conductors combining to determine a particular condition of remanent magnetization in said preferred flux path at particular ones of said information addresses defined by said particular one of said electrical conductors and said particular ones of said magnetic conductors, means for applying a current pulse of an opposite direction to said particular one of said electrical conductors to switch the condition of said remanent magnetization at said particular ones of said information addresses, and means for detecting voltage changes in each of said magnetic conductors.

41. An information storage matrix according to claim 40 in which said means for establishing said substantially helical flux path comprises means for applying a torsional stress to each of said magnetic conductors.

42. A memory element comprising a magnetic first conductor having a substantially rectangular hysteresis characteristic, means for applying stress to said magnetic first conductor to establish a preferred flux path in said first conductor, a second conductor inductively coupled to said first conductor, means for coincidentally applying currents to said first and second conductors for determining a remanent magnetic flux in said preferred flux path in one direction, means for shifting the direction of remanent magnetic flux in said preferred flux path from said one direction to read out the information stored therein, and means electrically connected to said first magnetic conductor for detecting said shifting of the direction of said magnetic flux.

43. A memory element comprising an electrically conductive wire of a magnetic material having substantially rectangular hysteresis characteristics, inductive means coupled to a discrete segment of said wire, a first pulse source connected to said inductive means energizable for applying a current thereto for applying a longitudinal magnetic field to said segment, and a second pulse source connected to said wire energizable for applying a current of one polarity to said wire for applying a circular magnetic field in one direction to said segment, said longitudinal field and said circular field in one direction cooperating to induce a helical condition of remanent magnetization in said segment in one sense representative of one binary value.

44. A memory element according to claim 43 in which said second pulse source is also energizable for applying a current of the opposite polarity to said wire for applying a circular magnetic field in the opposite direction to said segment, said last mentioned field and said longitudinal field cooperating to induce a helical condition of remanent magnetization in said segment in the opposite sense representative of the other binary value.

45. A memory element according to claim 44 also comprising means for applying other currents to said wire for switching said conditions of remanent magnetization in said segment, and means for detecting voltage changes between the ends of said wire.

References Cited in the file of this patent

UNITED STATES PATENTS

| | | |
|---|---|---|
| 2,041,147 | Preisach | May 19, 1936 |
| 2,112,084 | Frey et al. | Mar. 22, 1938 |
| 2,706,329 | Hespenheide | Apr. 19, 1955 |
| 2,724,103 | Ashenhurst | Nov. 15, 1955 |
| 2,732,542 | Minnick | Jan. 24, 1956 |
| 2,743,507 | Kornei | May 1, 1956 |
| 2,746,130 | Davis | May 22, 1956 |

FOREIGN PATENTS

| | | |
|---|---|---|
| 1,105,870 | France | July 13, 1955 |

OTHER REFERENCES

"Nondestructive Sensing of Magnetic Cores," by Dudley A. Buck and Werner I. Frank, pp. 822 to 830, "Communications and Electronics" for January 1954.